United States Patent [19]

Marcous et al.

[11] Patent Number: 5,650,604

[45] Date of Patent: Jul. 22, 1997

[54] SYSTEM AND METHOD FOR ELECTRONIC TRANSFER OF FUNDS USING AN AUTOMATED TELLER MACHINE TO DISPENSE THE TRANSFERRED FUNDS

[75] Inventors: Neil P. Marcous; Michael J. Brant, both of Mountain Lakes; Michael J. Rosenzweig, Morris Plains, all of N.J.

[73] Assignee: Electronic Data Systems Corporation, Plano, Tex.

[21] Appl. No.: 392,423

[22] Filed: Feb. 22, 1995

[51] Int. Cl.[6] .................................................. G06F 17/60
[52] U.S. Cl. .............................. 235/379; 902/8; 902/12; 902/13
[58] Field of Search ........................... 235/379; 902/8, 902/10, 12, 13, 14; 364/408

[56] References Cited

U.S. PATENT DOCUMENTS

| | | | |
|---|---|---|---|
| 4,408,203 | 10/1983 | Campbell | 340/825.34 |
| 4,423,316 | 12/1983 | Sáno et al. | 235/379 |
| 4,988,849 | 1/1991 | Sasaki | 235/379 |
| 5,122,950 | 6/1992 | Benton | 364/408 |
| 5,265,008 | 11/1993 | Benton | 364/408 |
| 5,283,829 | 2/1994 | Anderson | 380/24 |
| 5,326,960 | 7/1994 | Tannenbaum | 235/379 |
| 5,343,529 | 8/1994 | Goldfine et al. | 380/23 |
| 5,350,906 | 9/1994 | Brody | 235/379 |
| 5,371,797 | 12/1994 | Bocinsky | 380/24 |
| 5,455,407 | 10/1995 | Rosen | 235/380 |
| 5,457,305 | 10/1995 | Akel | 235/379 |
| 5,461,217 | 10/1995 | Claus | 235/380 |
| 5,465,206 | 11/1995 | Hilt | 364/406 |

FOREIGN PATENT DOCUMENTS

PCT/US84/01256  8/1984  WIPO.

*Primary Examiner*—Donald T. Hajec
*Assistant Examiner*—Karl Frech
*Attorney, Agent, or Firm*—L. Joy Greibenow

[57] ABSTRACT

A system and method for fully automated electronic transfer of cash or cash equivalent between a sender and a recipient is shown, including an initiating terminal for receiving a designation of an amount of money to be electronically transferred, an account from which it is to be transferred, and a security code from the sender, a central terminal for storing the amount and the security code in a file in the central terminal, and a dispensing terminal for receiving from the recipient an entry corresponding to the designated amount of money to be transferred and the security code, for providing the entered amount of money and security code to the central terminal for comparison with the information stored in the central terminal's file, and for dispensing to the recipient funds equivalent to the designated amount of money without requiring the recipient to have a card to activate the dispensing terminal.

60 Claims, 2 Drawing Sheets

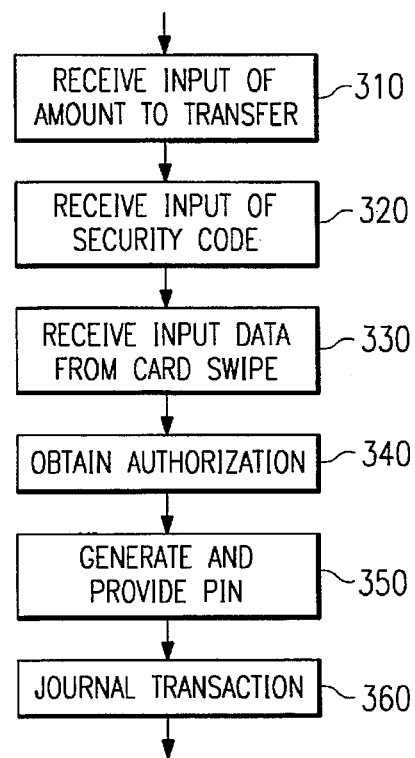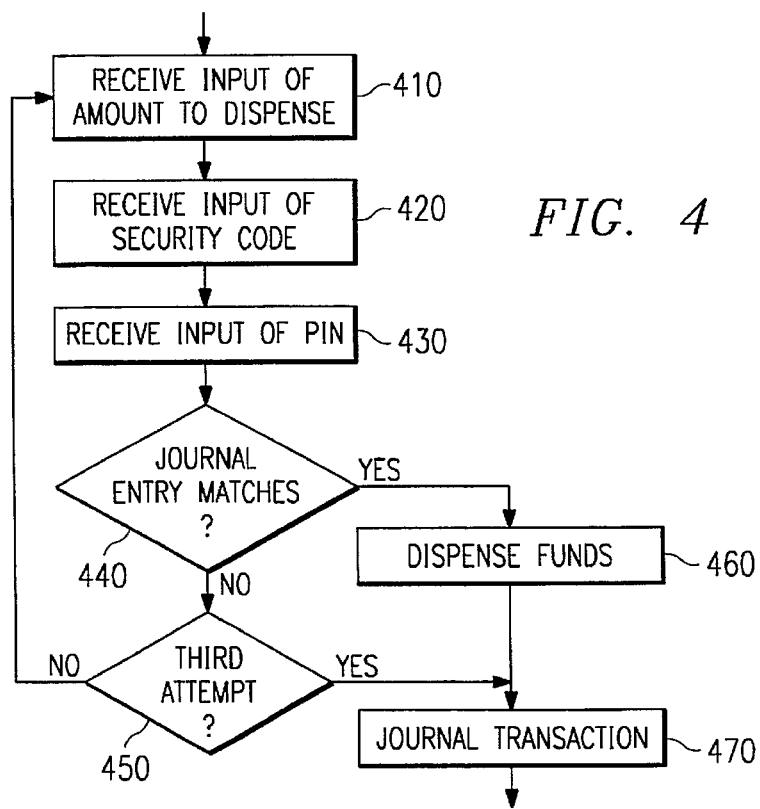

SYSTEM AND METHOD FOR ELECTRONIC TRANSFER OF FUNDS USING AN AUTOMATED TELLER MACHINE TO DISPENSE THE TRANSFERRED FUNDS

BACKGROUND OF THE INVENTION

1. Field of the Invention

The present invention relates generally to electronic transfer of funds, and more particularly to a system and method for electronic transfer of funds between a sender and a recipient using an automated teller machine to dispense the funds transferred to the recipient.

2. Description of the Related Art

Although "money wiring" was developed over 100 years ago to provide the rapid transfer of honey from one point to another distant location, people in today's society still sometimes find themselves with a need to send or receive cash quickly, such as for emergency situations. These people widely vary from individuals who frequently relocate to individuals with dependents away from home. Regardless of the reason for needing to quickly transfer cash, the ability to "wire" money quickly has been very popular. Probably the most well-known provider of "money wiring" or money transfer service is Western Union.

To send money, a customer (hereinafter referred to as "sender") goes to an agent location, presents cash or a cashier's check in the amount of the principal to be transferred plus a service or convenience fee, gives the agent the name of the person to whom the money is to be sent, and is issued a receipt. The agent, using a computer in many cases, then registers the transaction which updates the Western Union system automatically. Another option for money transfer with Western Union is for a sender to call a toll-free telephone number and provide the answering agent the above-described information. The principal to be transferred, together with an increased convenience fee, are charged to a major credit card as a cash advance.

Another company specializing in money transfer services is Integrated Payment Systems (IPS), a division of First Data Corporation, allows a sender to use a credit card, as well as cash or a cashier's check, at any agent location. To be able to receive the transferred funds, the recipient again must go to an agent location, must have proper identification (valid driver's license or military ID), know where the money is coming from, the sender's name and how much is to be received.

There are a number of drawbacks to the money transfer processes described above. A recipient must find an agent location which is open—extremely difficult to do at night— and which carries sufficient cash to complete the transaction. If the agent selected by the recipient does not have enough cash, the agent will offer to give the recipient some of the cash and a check for the remainder. Often this negates the reason the cash was sought in the first place, or requires additional work on the part of the recipient to find some place that will cash the check. The sender must first purchase a cashier's check if he does not wish to carry the cash to be sent. If the sender does not have a major credit card, though he may have sufficient funds in a bank account, he may not have access to large sums of money at all hours. The privacy of both sender and recipient is compromised because the transaction is dependent on sales agent interaction. Delays may occur as a result of agent transposition or typographical errors. Moreover, such a system is very labor-intensive and costly to operate.

In an effort to overcome some of these disadvantages, BayBank developed a system which allows its customers to transfer and receive funds between most BayBank accounts electronically. While the recipient or sender does not have to be a BayBank customer, they do need to have a valid, identifiable bank account at another "linked" (affiliated) bank. A BayBank cardholder can wire money to a recipient's bank account anywhere in the United States. The only information the BayBank sender needs is the recipient's bank number and account number. The wire transfer automatically debits the BayBank account and deposits the funds in the recipient's designated account. Any BayBank customer may also receive funds from another bank. The sender must be a customer of a participating bank on the BayBank network, but the BayBank customer will be able to receive funds deposited electronically in the BayBank account.

There are still disadvantages with such a system. The BayBank system is a closed system and requires the participants (sender and recipient alike) to have accounts with BayBank or one of its affiliated banks. Moreover, a recipient still requires a card to get access to the transferred funds and the funds are transferred from account to account, rather than dispensing cash directly to the intended recipient.

SUMMARY OF THE INVENTION

In view of the above problems associated with the related art, it is an object of the present invention to provide a system and method for electronic funds transfer whereby the recipient does not need to have a bank account to receive the transferred funds.

It is another object of the present invention to provide a system and method for electronic funds transfer whereby the sender and the recipient do not need to share the same, or any financial affiliations.

It is a further object of the present invention to provide a system and method for electronic funds transfer whereby the money is not deposited into a recipient's bank account, but the cash, or cash equivalent, is issued directly to the designated recipient.

It is a further object of the present invention to provide a system and method for electronic funds transfer whereby cash, cash equivalent or other desired dispensed document (e.g., tickets, stamps, etc.) is issued directly to the designated recipient.

It is a further object of the present invention to provide a system and method for electronic funds transfer whereby the system employs an automated teller machine (hereinafter referred to as an "ATM") to dispense funds.

It is still a further object of the present invention to provide a system and method for electronic funds transfer wherein the recipient does not need to have a financial card to activate the ATM or receive funds.

The present invention achieves these objects by providing a system and method for electronic transfer of funds between a sender and a recipient, including an initiating terminal for receiving a designation of an amount of money to be electronically transferred, preferably an account from which it is to be transferred, and a security code from the sender preferably encrypted by the initiating terminal, a central terminal for storing the amount and the encrypted security code in a file in the central terminal, and a dispensing terminal for receiving from the recipient an entry corresponding to the designated amount of money to be transferred and the security code, preferably for encrypting the security code, for providing the entered amount of money and encrypted security code to the central terminal for comparison with the information stored in the central terminal's file, and for dispensing to the recipient funds equivalent to the designated amount of money without requiring the recipient to have a card to activate the dispensing terminal.

The system and method of the present invention provides a completely electronic funds transfer mechanism, thereby eliminating the third party sales agent(s) in the transfer process. By eliminating the agent(s), the fixed costs of operating the system is decreased while the privacy and dignity of the sender/recipient relationship is restored. Additional benefits achieved with the present invention include allowing individuals to transfer money, at the customer's convenience twenty-four (24) hours a day, seven (7) days a week. The costs to send money is reduced. The present invention is appealing to those recipients who either are unbanked (no financial institution affiliation or accounts) or have a different financial institution affiliation than the sender. Additionally, the consumer realizes convenience in originating a money transfer from home or a nearby ATM.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 3 is a block diagram illustrating the initiating side of a transaction performed according to a preferred embodiment of the present invention; and FIG. 4 is a block diagram illustrating the dispensing side of a transaction performed according to a preferred embodiment of the present invention.

DETAILED DESCRIPTION OF THE PREFERRED EMBODIMENTS

Figure 1:
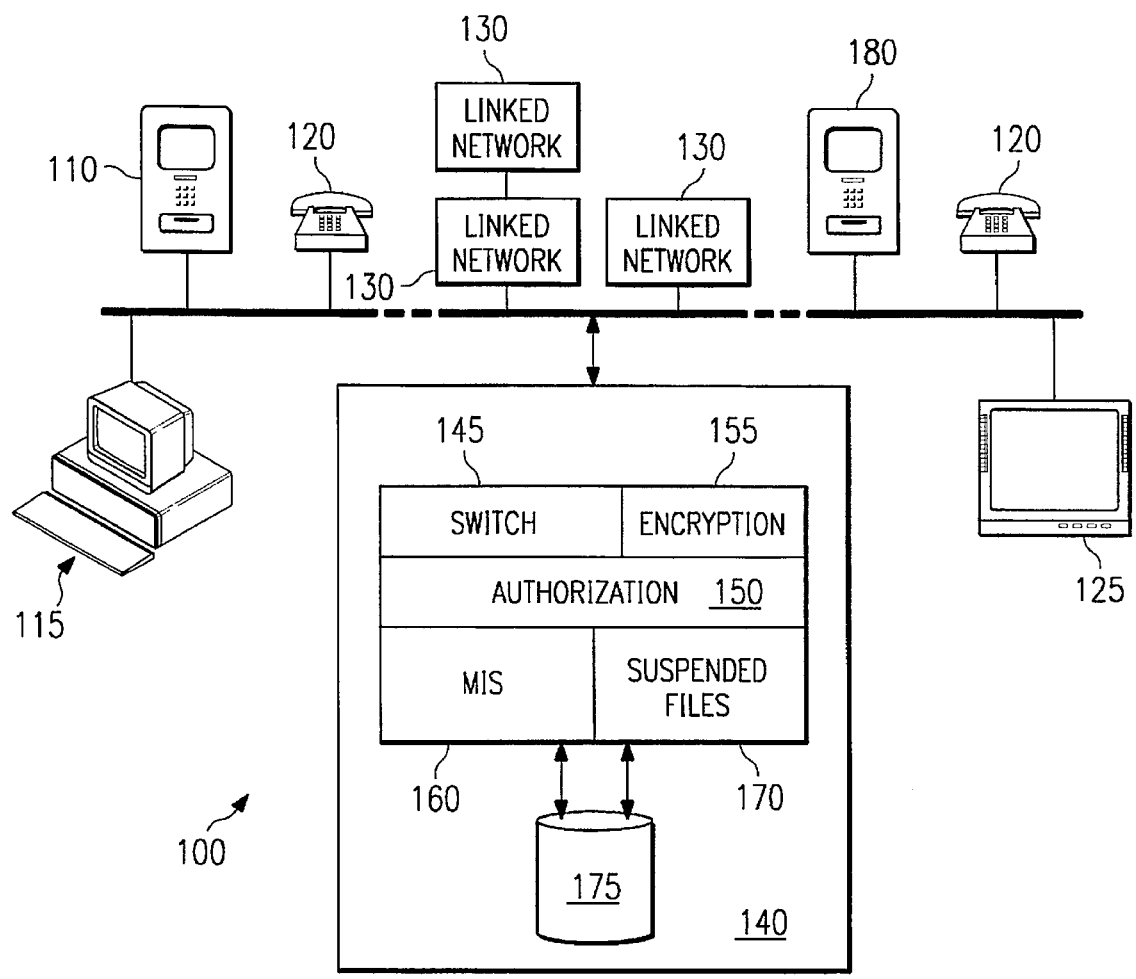
FIG. 1 is a schematic diagram of an example network illustrating an embodiment of the present invention.

The present invention electronically transfers funds from individual to individual, preferably using an ATM to dispense such funds to the appropriate recipient. Thus, the present invention makes funds available to individuals, seven (7) days a week and twenty-four (24) hours a day. Using an ATM or a home banking device, an initiator (sometimes referred hereinafter as a "sender") can rapidly make cash available to a recipient who has access to an ATM that is part of the present invention.

As a brief overview, the initiator preferably uses a touch-tone telephone with a card reader via a voice response unit to access the system services of the present invention. It should be understood that the initiator could instead have gone to an ATM, or used a personal computer outfitted with the capability to access the system service of the present invention. With these latter options, the initiator preferably interacts with the system of the present invention via a graphic user interface (GUI).

Regardless of the input terminal selected (telephone, personal computer, ATM, etc.), the initiator uses a card to make funds available from a financial account corresponding to the card. Such card could be a credit card, debit card, smart card or stored value card. It should be understood that the sender may still present cash to an agent, if desired. Such a sender may be without any financial institution affiliation (hereinafter referred to sometimes as "unbanked"), such as a student away at school, or a seasonal worker. In this scenario, the agent would in turn interact with the system of the present invention as if the agent were the "sender". Even with this approach the recipient does not require a card to activate the selected ATM or any financial institution affiliation whatsoever to receive the designated funds.

At this point, the funds to be transferred are held or pre-authorized as available and the sender's account is also debited the amount of the customary transaction or convenience fee. A convenience fee, which is ordinarily paid by a sender, is charged for each money transfer transaction. According to the preferred embodiment of the present invention, the present system provides the sender with a system-generated PIN which must be communicated by the sender to the recipient as part of the security information the recipient will need to obtain the transferred funds.

The recipient, after obtaining from the sender the appropriate security information, preferably: 1) the sender's phone number, 2) the amount of money transferred and, 3) the system-generated PIN issued to the sender by the initiating terminal, then goes to an ATM which has electronic funds transfer capability as described herein. According to the preferred embodiment of the present invention, and further discussed below, such ATM has been programmed to accept input from a user without the user needing to use a card of any type. As a result, the recipient interacts with the ATM, without using a card, to activate the appropriate menus. The recipient inputs the information as requested by the ATM screens and the cash is dispensed to the intended recipient.

The present invention can probably best be understood by considering it as two distinct transactions, which will hereinafter be referred to as initiating and dispensing, together comprising the overall transaction. Those of ordinary skill in the art will understand considering the initiating terminal as an "issuer" and the pseudo-terminal (or central terminal) as an "acquirer" for purposes of the initiating transaction, as well as considering the pseudo-terminal as an "issuer" and the dispensing terminal as an "acquirer" for purposes of the dispensing transaction. The initiating transaction is preferably portrayed as a withdrawal with a convenience charge.

The initiating transaction nay also be logically considered in three parts: the request for transfer, the request for authorization, and the approval. Consider FIG. 1, which is a schematic diagram of an example network illustrating an embodiment of the present invention. The initiating transaction begins with the request for transfer of funds from an initiating terminal. This "terminal" is the medium the sender uses to create the request to electronically transfer money, e.g., ATM 110, personal computer with Graphical User Interface (GUI) 115, telephone-accessed Voice Response Unit (VRU) 120 or screen phone with GUI (not specifically shown), etc. The GUI preferably supports at least Windows, DOS or Macintosh environments. In the case of a telephone initiating terminal, a sender dials into a voice response unit (hereinafter referred to as a "VRU"; not shown) that prompts him verbally, such prompts corresponding to the information provided by graphical user interface screens for other types of initiating terminals such as personal computers 115, screen phones 120, televisions 125 or ATMs 110. For the sake of the following discussion, and unless otherwise stated, the initiating terminal will be ATM 110. It should be understood that any of the initiating terminals 110,115,120, 125 described herein could have been used instead.

Initiating terminal 110 preferably permits the transmission of debit or credit card information with the associated PIN encrypted and encoded to ensure security as to the debit or credit card information. Such terminal, if not an ATM which is customarily DES-secure, preferably includes a device (not shown) which securely encrypts information attached to the communications line. Such device attaches to a telephone, screen phone, television set top box, personal computer, etc. and permits secure financial transactions from the home or work place. Several companies manufacture a device which securely encrypts information, such as ised corporation, and therefore such device will not be described in further detail herein.

Fully automated electronic transfer system 100 also preferably has an adjustment system (not shown). If a sender changes his mind prior to the recipient receiving the funds, wanting to have his money returned, the present system reverses the transaction, with any customary convenience fee potentially forfeit.

The sender selects from the screen or menu, depending upon the medium employed, the appropriate option to interact with the system of the present invention. When the sender begins interacting with system 100 via initiating terminal 110, he is preferably told promptly about any convenience fee to be assessed to perform the desired transaction. Initiating terminal 110 preferably requests certain information from the sender, such as what amount of principal is to be transferred, and a security code to be associated with the transaction. Such security code is preferably a phone number, including the area code, but may also be another unique number such as a social security number or fanciful choice of the sender. Initiating terminal 110 preferably encrypts the security code input by the sender. The amount of principal and the encrypted security code are preferaby a part of a key used by system 100 of the present invention to create the system-generated access PIN. By encrypting the sender's security code, and using it in the algorithm to create the system-generated PIN, the transaction is secure. For this reason, anyone watching the transaction will not know the sender's security code as it will be passed and stored in its encrypted state, rather than in the clear. Then the sender selects the option offering electronic funds transfer according to the present invention, the network identifier field in the message is prefilled with at least a unique transaction and network code so that initiating terminal 110 will route the transaction to pseudo-terminal 140, before it tries to match the transaction on another network. While various implementations will occur to those skilled in the art, pseudo-terminal 140 preferably includes switch 145, authorization unit 150 and suspended journal files 170 running on a Tandem-based platform, a SUN 2000 workstation for relational database 175 and MIS journal files 160, and ESA9000 IBM mainframe for off-line (batch) processing and financial records maintenance.

Initiating terminal 110 passes the requested transaction information received from the sender to pseudo-terminal 140 which information is used by the system of the present invention to match the two parts of the overall transaction. Initiating terminal 110 sends a request for authorization, to pseudo-terminal 140, thereby entering the next stage of the initiating transaction. Switch 145 of pseudo-terminal 140 accepts the incoming financial request and activates authorization unit 150. Authorization unit 150 in turn forwards the request to an authorization agent (not shown). Pseudo-terminal 140 preferably has the appropriate linkages to the debit card networks and the credit card authorization point to authenticate the card and account information belonging to the sender desiring to transfer money. Among the information provided to the authorization agent is the request for authorization for the principal amount desired by the sender to be transferred, together with the appropriate convenience or service fee.

The authorization agent receives the financial information from pseudo-terminal 140 and, assuming sufficient funds or credit exists in the referenced account, authorizes the transaction for the full amount of the principal and convenience fee. It should be understood that the authorization agent may be a financial institution, a card issuer, an intercept processor, or a regional/national network. The system of the present invention preferably permits customization to thereby allow the participating institutions to set their own approval limits for their customers.

As there are numerous known ways for obtaining authorization, any of which are compatible with the system and method of the present invention, the actual authorization method carried out by an authorization agent will not be considered in more detail herein. Moreover, it should be understood that the platform of pseudo-terminal 140 of the present invention may also be the authorization agent and perform authorization approval with the permission and within the guidelines established by a particular financial institution.

Once the authorization agent returns an approval message to pseudo-terminal 140, the initiating transaction has entered the authorization approved stage. Once pseudo-terminal 140 receives the approval message, it generates a PIN which is sent to initiating terminal 110 to be provided to the sender of the funds. This system-generated PIN is preferably part of the identification system 100 of the present invention requests from the recipient to assure the funds are provided to the intended recipient during the dispensing portion of the overall transaction. Specifically, according to a preferred embodiment of the present invention, after the authorization request is approved, pseudo-terminal 140 preferably requests a unique DES-encrypted PIN from encryption module 155 which generates unique numbers based on predetermined security keys. A hardware example of module 155 is produced by Atalla, a subsidiary of Tandem Corporation. It should be understood that number generating module 155 need not be hardware in implementation and still remain true to the spirit of the present invention. Moreover, it will be apparent to those skilled in the art that the request for a unique PIN may instead be made concurrently with the request to the card issuer for approval. Once the PIN has been generated, it is communicated to the sender. The PIN is preferably transmitted to initiating terminal 110, which in turn communicates the PIN to the sender. The PIN can be provided to the sender via a variety of methods, depending upon initiating terminal limitations: an ATM may print out a receipt, the PIN may be displayed visually on a graphical user interface, or it may be provided through the telephone via the VRU, just to name a few such methods. Any receipt is preferably provided by initiating terminal 110 itemizing the principal amount transferred, the convenience fee charged the sender's account for the transaction, if any, and, if the sender has so requested, the system-generated PIN.

Figure 2:
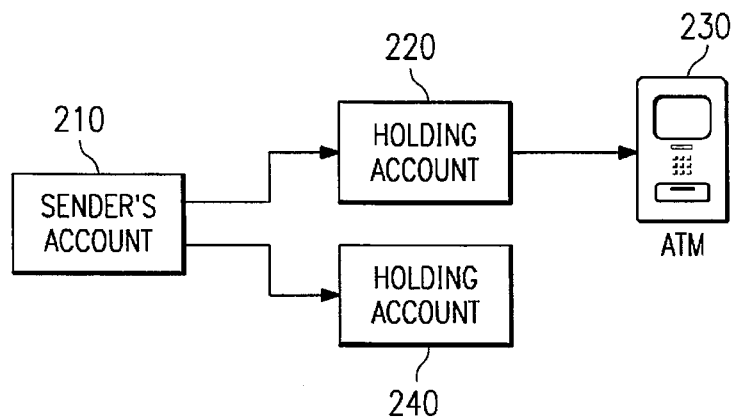
FIG. 2 is a schematic illustration of principal and fee transfer according to a preferred embodiment of the present invention.

Consider momentarily FIG. 2, which is a schematic block illustration of principal and fee transfer according to a preferred embodiment of the present invention. Upon receipt of the approval message, which amounts to approval of the authorization request and reflects the fact the initiator does in fact have the money to send or a credit card account that will accept the cash advance drawn against it, pseudo-terminal 140 also "withdraws" the money from sender's account 210. Pseudo-terminal 140 credits holding account 220 with the principal monies so as to be available for ATM 230 during the dispensing portion of the overall transfer transaction. Pseudo-terminal 140 also credits holding account 240 with any convenience fee, which fee will be settled on a predetermined basis among the parties owning the pieces of the system responsible for carrying out the overall transfer transaction. The distribution of the convenience fee is preferably a batch process.

As is normal business practice of the EFT industry, once the present system has received the authorization approval message, the relevant financial institution has committed to reimburse the owner of the ATM that will, in effect, be advancing funds on the sender's behalf when it dispenses cash to the recipient. Thus, that authorization approval is a guarantee on the part of the issuing institution that the acquiring institution will be reimbursed. For this reason, the system according to the present invention can complete the overall transaction even in advance of actually getting the funds from the institution.

Returning to FIG. 1, upon receipt of the approval message, the completion of the initiating transaction is also journaled on MIS journal files and suspended journal files 170. Pseudo-terminal 140 logs the transaction in the relational databases 175 for later transaction lookup as well as for long-term storage, retrieval, and reporting for subsequent research on that data.

Pseudo-terminal 140 lists the amount of the principal to be dispensed in suspended journal files 170 for later matching activity during the dispensing transaction. Suspended journal files 170 are preferably online and any particular transaction is stored therein by three pieces of information: 1) the encrypted security code provided by the sender; 2) the system-generated PIN associated with the particular transaction; and 3) the principal amount of the transaction. Suspended journal files 170 are preferably holding files that are monitored for a length of time and, if desired other parameters, while waiting for the second half of that particular transaction to complete. If the second half of the transaction never completes and a predetermined time elapses, the convenience charge if any is kept and the original amount is then forced through as a reverse or as a deposit into the sender's card account as if the transaction didn't occur, less any convenience fee charged.

Look now at FIG. 3, which is a block diagram illustrating the initiating side of a transaction performed according to a preferred embodiment of the present invention. Initiating terminal 110 preferably requests input of the amount to be transferred (Block 310) and input of a security code (Block 320). As discussed above, such security code may be as simple as the sender's phone number, and is encrypted at the initiating terminal, sent to the central terminal and stored in its encrypted state. Initiating terminal 110 then requests input via card swipe, including PIN for the card used where appropriate (Block 330). Such card swipe information is preferably provided to authorization unit 150 for obtaining authorization approval (Block 340). When such approval has been granted, pseudo-terminal 140 passes the input received as a result of Blocks 310 and 320 to encryption module 155 to generate a transaction PIN. Pseudo-terminal 140 transmits such PIN to initiating terminal 110 which in turn communicates the PIN to the sender. Initiating terminal 110 directs the sender to provide the amount to be transferred, the security code, and the PIN to his intended recipient (Block 350) in order to receive the designated and transferred funds. Pseudo-terminal 140 journals the transaction for future transaction look-up and information matching as further discussed herein (Block 360).

As noted earlier, the sender may change his mind and request the transaction be canceled. If the transaction is reversed, the principal monies are returned. System 100 preferably initiates an automatic or immediate reversal as a transaction command. Nevertheless, even if the sender "cancels" the transaction, the system according to a preferred embodiment still logs the transaction for MIS purposes in MIS journal files 160.

The second transaction, the dispensing transaction, can also be logically considered in three parts: the request for authorization, the approval, and the dispensing of funds to the intended recipient.

The recipient, the person who is actually receiving those funds deemed "outstanding" in suspended journal files 170, does not need to have any financial institution affiliation whatsoever. For this reason, according to the preferred embodiment of the present invention, dispensing terminal 180 does not require a card to initiate the dispensing half of the overall electronic funds transfer transaction. Dispensing terminal 180 of the transaction is the particular dispensing mechanism, (preferably an ATM) which the recipient uses to obtain the funds which have been made available by the sender. It should be observed that initiating terminal 110 may also be dispensing terminal 180 for the same or a different transaction.

Before the present invention, ATM drivers place an ATM in a CARD-READ initial state. An ATM in this state displays a "welcome screen" and waits for a card to be inserted to push the ATM into the next state, which will flow through the transaction process. For the present invention, the ATM drivers preferably initially place the ATM in a SELECTION-STATE. This state will display the "welcome screen" as any other ATM. However, according to the present invention, these ATMs will wait for a key to be pressed to push the ATM to the next state (as opposed to a card insertion at the CARD-READ initial state). At this point the ATM will have two options. If the user pushes a button corresponding to a banking transaction, one in which a card is required to initiate the transaction, the ATM proceeds into the CARD-READ state and process the transaction according to normal procedure. If the user instead selects a button corresponding to receiving electronically transferred funds as described in the present invention, the ATM will follow the screen flow to process the dispensing portion of such transaction.

This capability is achieved by changing the load to the ATM to instruct the ATM to support the initial SELECTION-STATE. As another preferred embodiment, the software load to the ATM may instead be changed to instruct the ATM to support either a button selection or card insertion as an acceptable response to the ATM sufficient to push the ATM into the next appropriate state and process flow corresponding to the designated action. In other words, the ATM preferably would activate based on either a card insertion or key press at the "welcome screen."

The dispensing half of the overall transaction begins with the request for authorization which occurs via dispensing terminal 180. Dispensing terminal 180 may be located anywhere including a convenience store, a grocery store, a post office, a branch of a financial institution, a mall, or other location. To activate ATM 180's request for authorization, the recipient is prompted to provide certain pieces of information in order to create a match in suspended journal files 170. Such information preferably includes: 1) the principal amount to be dispensed, 2) the security code (such as a phone number) of the sender, and 3) the system-generated PIN issued to the sender, which PIN the sender has communicated to the recipient. As with the initiating terminal, dispensing terminal 180 preferably encrypts the received security code.

Once this information has been entered, dispensing terminal 180 sends a message to pseudo-terminal 140 requesting authorization to dispense the principal amount of the transaction. Pseudo-terminal 140 maintains suspended journal files 170 bearing the listing of all electronic transfer transactions which have their initiating portions completed. The information input by the recipient is used by pseudo-terminal 140 to determine which transaction is being considered and whether there is a match with the information already stored in suspended journal files 170. Authorization unit 150 includes a mapping system (not shown).

Looking now at FIG. 4, which is block diagram illustrating the dispensing side of a transaction performed according to a preferred embodiment of the present invention. The system of the present invention request the recipient to enter the dollar amount of funds expected (Block 410), the designated security code (Block 420), which is then preferably encrypted by dispensing terminal 180, and the system-generated PIN (Block 430). The transaction is then communicated to pseudo-terminal 140. Switch 145 sees the transaction as a withdrawal request with a point of service code that tells pseudo-terminal 140 that this is a request from a dispensing terminal.

Pseudo-terminal 140 activates authorization unit 150 to determine whether the requesting recipient is entitled to receive the specified funds. Authorization unit 150 then compares the information input by the recipient, including the encrypted security code, with the information stored in suspended journal files 170 via relational database 175.

Assuming there is no match, pseudo-terminal 140 transmits a message directing ATM 180 to request the recipient re-enter the information. Once such information has been reinput, ATM 180 again sends the message to pseudo-terminal 140 to determine a match. While this cycle may be repeated as many times as desired, it is preferably repeated only three times before ATM 180 is directed to end the transaction and return to its SELECTION-STATE to wait for the next customer.

On the other hand, assuming pseudo-terminal 140 determines there is a match between the information provided by the recipient and that listed within suspended journal files 170, pseudo-terminal 140 issues an authorization approval message to dispensing terminal 180 indicating that the request for authorization has been approved and directing ATM 180 to begin the process of dispensing the designated amount of funds. Pseudo-terminal 140 also logs the transaction in MIS journal files 160 for settlement of any convenience fee, in suspended journal files 170, and in relational database 175. Once the transaction has been matched against suspended journal files 170 and the funds have been dispensed, information corresponding to the initiating portion of the transaction are preferably deleted from suspended journal files 170 because both parts have been completed. Pseudo-terminal 140 then preferably journals the completion of the transaction on both MIS journal files 160 and suspended journal files 170.

Dispensing terminal 180 preferably dispenses the entire amount of money that has been sent even if, for example, the amount of funds to be transferred exceed the stated per entry per account dispensing limits established by the owner of the ATM. According to a preferred embodiment of the present invention, there is an internal mechanism which forces an ATM to perform multiple dispensing iterations. It should be understood that when an ATM must perform such multiple iterations, it preferably appears as a single transaction to the recipient of the funds. For example, assume the authorization agent authorized the dispensing of $500 to the sender's intended recipient. The ATM may have been limited by its owner to dispense only $200 per entry per account. According to the preferred embodiment of the present invention, the ATM dispenses the authorized $500 by performing three dispensing iterations: two for $200 and one for $100.

It should be understood by those skilled in the art that pseudo-terminal 140 of the present invention can be accessed from any number of networks with their own initiating and dispensing terminals. Because of this open design, an ATM on one network, for example, can transfer money to an ATM on a different network, or a PC initiating terminal 115 can transfer money to an ATM on a different network, etc. FIG. 1 illustrates that any number of networks 130, including regional and national networks, can be linked in a variety of arrangements to access pseudo-terminal 140, thereby permitting unrelated institutions to interact and share resources. It will also be realized by those skilled in the art that these various networks 130 may be networks international to the location of pseudo-terminal 140. This feature of the present invention allows a sender to place money in their relatives' hands in a matter of moments even if they are traveling or working in other countries.

As yet another preferred embodiment, initiating terminal 110 is equipped with the capability to accept cash directly input into a mechanism associated with initiating terminal 110, validate how much as been input, and continue the transaction thereafter. When such an initiating terminal is employed, the authorization steps relative to seeking approval of credit or debiting an account discussed above in connection with a card-driven initiating terminal are omitted.

It should be understood that the present invention is also applicable to transfer items other than strictly cash. Examples of such items, for illustration purposes only and not as limitation, include: tickets, traveler's checks, stamps, etc.

It should be understood by those skilled in the art that the present description is provided only by way of illustrative example and should in no manner be construed to limit the invention as described herein. Numerous modifications and alternate embodiments of the invention will occur to those skilled in the art. Accordingly, it is intended that the invention be limited only in terms of the following claims:

We claim:

1. A system for automated electronic transfer of funds between a sender and a recipient, comprising:
    an initiating terminal for receiving a designation of an amount of funds to be electronically transferred from said sender, and providing a unique personal identification number to said sender;
    a central terminal for providing to said initiating terminal said unique personal identification number for each electronic transfer of funds transaction, and storing said amount of money to be transferred and said unique personal identification number in a file therein; and
    a dispensing terminal for receiving an entry corresponding to each of said designated amount of money and said unique personal identification number, for providing said entry corresponding to each of said designated amount of money and said unique personal identification number to said central terminal for comparison with said file, for receiving confirmation of positive match between said entry and said file, and for dispensing funds corresponding to said designated amount of money directly to said recipient without requiring said recipient to have a card to activate said dispensing terminal.

2. The system for automated electronic transfer of funds of claim 1, wherein said initiating terminal is an automated teller machine (ATM).

3. The system for automated electronic transfer of funds of claim 1, wherein said initiating terminal is a personal computer with a graphical user interface.

4. The system for automated electronic transfer of funds of claim 1, wherein said initiating terminal is a touch-tone telephone with a voice response unit.

5. The system for automated electronic transfer of funds of claim 4, wherein said touch-tone telephone is a screen phone.

6. The system for automated electronic transfer of funds of claim 1, wherein said central terminal further comprises a number generator for generating said unique personal identification number.

7. The system for automated electronic transfer of funds of claim 1, wherein said dispensing terminal is an automated teller machine (ATM).

8. The system for automated electronic transfer of funds of claim 1, wherein said initiating terminal encrypts said security code before providing said encrypted security code to said central terminal.

9. The system for automated electronic transfer of funds of claim 1, wherein said dispensing terminal encrypts said security code before providing said encrypted security code to said central terminal.

10. The system for automated electronic transfer of funds of claim 1, wherein said designation of an amount of money is the provision of actual legal tender.

11. The system for automated electronic transfer of funds of claim 1, wherein said initiating terminal also includes a financial card reader.

12. The system for automated, electronic transfer of funds of claim 11, wherein said financial card is a credit card.

13. The system for automated electronic transfer of funds of claim 11, wherein said financial card is a debit card.

14. The system for automated electronic transfer of funds of claim 11, wherein said financial card is a smart card.

15. The system for automated electronic transfer of funds of claim 14, wherein said smart card is a stored value card.

16. The system for automated electronic transfer of funds of claim 1, wherein said initiating terminal further comprises a cash acceptance mechanism.

17. A method for fully automated electronic transfer of funds between a sender and a recipient, comprising the steps of:

receiving at an initiating terminal a designation of an amount of money to be electronically transferred from said sender;

providing, by a central terminal, a unique personal identification number to said initiating terminal;

providing, by said initiating terminal, said unique personal identification number to said sender;

storing said amount of money to be transferred and said unique personal identification number at said central terminal;

receiving at a dispensing terminal an entry corresponding to each of said designated amount of money and said unique personal identification number;

providing by said dispensing terminal said entry corresponding to each of said designated amount of money and said unique personal identification number to said central terminal for confirmational comparison; and dispensing by said dispensing terminal of funds corresponding to said designated amount of money directly to said recipient without requiring said recipient to have a card to activate said dispensing terminal.

18. The method for fully automated electronic transfer of funds of claim 17, wherein said dispensing terminal is an automated teller machine (ATM).

19. The method for fully automated electronic transfer of funds of claim 17, wherein said step of receiving at an initiating terminal further comprises the step of receiving financial card information from said sender.

20. The method for fully automated electronic transfer of funds of claim 19, wherein said financial card is a debit card.

21. The method for fully automated electronic transfer of funds of claim 19, wherein said financial card is a credit card.

22. The method for fully automated electronic transfer of funds of claim 19, wherein said financial card is a smart card.

23. The method for fully automated electronic transfer of funds of claim 22, wherein said smart card is a stored value card.

24. The method for fully automated electronic transfer of funds of claim 17, wherein said step of receiving at an initiating terminal further comprises a step of encrypting said security code.

25. The method for fully automated electronic transfer of funds of claim 17, wherein said step of receiving at a dispensing terminal further comprises a step of encrypting said security code.

26. The method for fully automated electronic transfer of funds of claim 17, wherein said step of receiving at an initiating terminal further comprises a step of receiving actual currency from said sender.

27. A method for fully automated electronic transfer of cash or cash equivalent between a sender and a recipient, comprising the steps of:

receiving at an initiating terminal a designation of an amount of money to be electronically transferred corresponding to an amount of cash or cash equivalent desired by said sender to be provided to said recipient, and a security code from said sender;

providing, by a central terminal, a unique personal identification number to said initiating terminal in exchange for receiving said amount and said security code;

providing, by said initiating terminal, said unique personal identification number to said sender;

storing said amount of money to be transferred, said security code, and said unique personal identification number in a file at said central terminal;

receiving, at a dispensing terminal, an entry corresponding to each of said designated amount of money, said security code and said unique personal identification number;

providing by said dispensing terminal said entry corresponding to each of said designated amount of money, said security code and said unique personal identification number to said central terminal for comparison with said stored file; and dispensing by said dispensing terminal of cash or cash equivalent corresponding to said designated amount of money directly to said recipient without requiring said recipient to have a card to activate said dispensing terminal.

28. The method for fully automated electronic transfer of cash or cash equivalent of claim 27, wherein said dispensing terminal is an automated teller machine (ATM).

29. The method for fully automated electronic transfer of cash or cash equivalent of claim 27, wherein said step of receiving at an initiating terminal further comprises the step of receiving financial card information from said sender.

30. The method for fully automated electronic transfer of cash or cash equivalent of claim 29, wherein said financial card is a debit card.

31. The method for fully automated electronic transfer of cash or cash equivalent of claim 29, wherein said financial card is a credit card.

32. The method for fully automated electronic transfer of cash or cash equivalent of claim 29, wherein said financial card is a smart card.

33. The method for fully automated electronic transfer of cash or cash equivalent of claim 32, wherein said smart card is a stored value card.

34. The method for fully automated electronic transfer of cash or cash equivalent of claim 27, wherein said step of receiving at an initiating terminal further comprises a step of encrypting said security code.

35. The method for fully automated electronic transfer of cash or cash equivalent of claim 27, wherein said step of receiving at a dispensing terminal further comprises a step of encrypting said security code.

36. The method for fully automated electronic transfer of cash or cash equivalent of claim 27, wherein said cash equivalent is at least one traveller's cheque.

37. The method for fully automated electronic transfer of cash or cash equivalent of claim 27, wherein said cash equivalent is stamps.

38. The method for fully automated electronic transfer of cash or cash equivalent of claim 27, wherein said step of receiving at an initiating terminal further comprises a step of receiving actual currency from said sender.

39. A fully automated system for electronic transfer of cash or cash equivalent between a sender and a recipient, comprising:
  an initiating terminal for receiving a designation of an amount of money to be electronically transferred corresponding to an amount of cash or cash equivalent desired by said sender to be provided to said recipient, an account from which it is to be transferred, and a security code from said sender;
  a central terminal for receiving said amount and said security code, storing said amount of money to be transferred and said security code in a file therein; and
  a dispensing terminal for receiving from said recipient an entry corresponding to each of said designated amount of money and said security code, for providing said entry corresponding to each of said designated amount of money and said security code to said central terminal for comparison with said file, for receiving confirmation of positive match between said entry and said file, and for dispensing directly to the recipient cash or cash equivalent corresponding to said designated amount of money without requiring said recipient to have a card to activate said dispensing terminal.

40. The system for fully automated electronic transfer of cash or cash equivalent of claim 39, wherein said initiating terminal is an automated teller machine (ATM).

41. The system for fully automated electronic transfer of cash or cash equivalent of claim 39, wherein said initiating terminal is a personal computer with a graphical user interface.

42. The system for fully automated electronic transfer of cash or cash equivalent of claim 39, wherein said initiating terminal is a touch-tone telephone with a voice response unit.

43. The system for fully automated electronic transfer of cash or cash equivalent of claim 39, wherein said central terminal further comprises a number generator for generating said unique personal identification number.

44. The system for fully automated electronic transfer of cash or cash equivalent of claim 39, wherein said dispensing terminal is an automated teller machine (ATM).

45. The system for fully automated electronic transfer of cash or cash equivalent of claim 39, wherein said initiating terminal encrypts said security code before providing said encrypted security code to said central terminal.

46. The system for fully automated electronic transfer of cash or cash equivalent of claim 39, wherein said dispensing terminal encrypts said security code before providing said encrypted security code to said central terminal.

47. The system for fully automated electronic transfer of cash or cash equivalent of claim 39, wherein said designation of an amount of money is the provision of actual legal tender.

48. The system for fully automated electronic transfer of cash or cash equivalent of claim 39, wherein said initiating terminal also includes a financial card reader.

49. The system for fully automated electronic transfer of cash or cash equivalent of claim 48, wherein said financial card is a credit card.

50. The system for fully automated electronic transfer of cash or cash equivalent of claim 48, wherein said financial card is a debit card.

51. The system for fully automated electronic transfer of cash or cash equivalent of claim 48, wherein said financial card is a smart card.

52. The system for fully automated electronic transfer of cash or cash equivalent of claim 51, wherein said smart card is a stored value card.

53. The system for fully automated electronic transfer of cash or cash equivalent of claim 39, wherein said cash equivalent is at least one traveller's cheque.

54. The system for fully automated electronic transfer of cash or cash equivalent of claim 39, wherein said cash equivalent is stamps.

55. A method for fully automated electronic transfer of cash or cash equivalent, comprising the steps of:
  receiving, at a central terminal, an electronic signal representing a designation of an amount of cash or cash equivalent to be electronically transferred and a security code from a sender;
  providing, by said central terminal, a unique personal identification number to be provided to said sender;
  storing said electronic signal representing said designation of an amount of cash or cash equivalent to be transferred and said security code, and said unique personal identification number in a file at said central terminal;
  receiving, by said central terminal, an entry corresponding to each of said designated amount of cash or cash equivalent, said security code and said unique personal identification number;
  comprising, by said central terminal, said electronic signal with said received entry for confirmational match; and
  providing, by said central terminal, a further signal to directly dispense cash or cash equivalent corresponding to said designated amount of money to a recipient without requiring a card to dispense said cash or cash equivalent.

56. The method for fully automated electronic transfer of cash or cash equivalent of claim 55, wherein said step of receiving, at a central terminal, an electronic signal representing a designation of an amount, further comprises the step of receiving financial card information from said sender.

57. A method for fully automated electronic transfer of cash or cash equivalent, comprising the steps of:

receiving, at a central terminal, an electronic signal representing a designation of an amount of cash or cash equivalent to be electronically transferred and a security code from a sender;

storing said electronic signal representing said designation of an amount of cash or cash equivalent to be transferred and said security code, at said central terminal;

receiving, by said central terminal, an entry provided, corresponding to each of said designated amount of cash or cash equivalent and said security code;

comparing, by said central terminal, said electronic signal with said received entry for confirmational match; and providing, by said central terminal, a further signal to directly dispense cash or cash equivalent corresponding to said designated amount of money to a recipient without requiring a card to dispense said cash or cash equivalent.

58. The method for fully automated electronic transfer of cash or cash equivalent of claim 57, wherein said step of receiving, at a central terminal, an electronic signal representing a designation of an amount, further comprises the step of receiving financial card information from said sender.

59. A method for fully automated electronic transfer of cash or cash equivalent, comprising the steps of:

receiving, at a central terminal, an electronic signal representing a designation of an amount of cash or cash equivalent to be electronically transferred from a sender;

providing, by said central terminal, a unique personal identification number to be provided to said sender;

storing said electronic signal representing said designation of an amount of cash or cash equivalent to be transferred and said unique personal identification number in a file at said central terminal receiving, by said central terminal, an entry corresponding to each of said designated amount of cash or cash equivalent and said unique personal identification number;

comparing, by said central terminal, said electronic signal with said received entry for confirmational match; and providing, by said central terminal, a further signal to directly dispense cash or cash equivalent corresponding to said designated amount of money to a recipient without requiring a card to dispense said cash or cash equivalent.

60. The method for fully automated electronic transfer of cash or cash equivalent of claim 59, wherein said step of receiving, at a central terminal, an electronic signal representing a designation of an amount, further comprises the step of receiving financial card information from said sender.

\* \* \* \* \*